United States Patent
Park

(10) Patent No.: US 7,409,754 B2
(45) Date of Patent: Aug. 12, 2008

(54) APPARATUS FOR CLOSING FLUID PASSAGES OF ENGINES

(75) Inventor: Chong-Jin Park, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 215 days.

(21) Appl. No.: 11/296,516

(22) Filed: Dec. 6, 2005

(65) Prior Publication Data

US 2007/0094858 A1    May 3, 2007

(30) Foreign Application Priority Data

Nov. 2, 2005    (KR) ...................... 10-2005-0104264

(51) Int. Cl.
*B23P 21/00*    (2006.01)
(52) U.S. Cl. .......................... 29/33 K; 29/33 P; 29/563; 29/525.01; 29/888.01; 123/90.11; 123/90.16; 267/140.12; 239/88
(58) Field of Classification Search ................. 29/33 K, 29/33 P, 563, 564, 564.1, 564.2, 521, 522.1, 29/523, 525.01, 701, 703, 771, 787, 428, 29/429, 431, 888.01, 888.06, 888.11, 888.4, 29/888.41, 888.46; 123/90.11, 90.12, 90.16, 123/188.1, 568.26; 267/140.12, 219; 239/88, 239/585.1, 125; 901/6, 7, 8, 31, 32, 33, 35, 901/41, 46; 198/463.1, 348, 339.1
See application file for complete search history.

(56) References Cited

U.S. PATENT DOCUMENTS 5,347,963 A * 9/1994 Chung ..................... 123/90.46
6,053,473 A * 4/2000 Shinobu et al. ......... 251/129.19
6,289,571 B1 * 9/2001 Ozawa et al. .................. 29/521
6,380,514 B1 * 4/2002 Han ......................... 219/125.1
6,467,154 B1 * 10/2002 Beggs ........................... 29/701
6,668,438 B2 * 12/2003 Sato et al. .................... 29/33 K
6,745,454 B1 * 6/2004 Grimshaw et al. ............. 29/563
6,757,974 B2 * 7/2004 Kido et al. ................. 29/890.14
6,772,493 B2 * 8/2004 Yamanashi et al. .......... 29/33 P
6,886,522 B1 * 5/2005 Lawrence ............... 123/195 R
2002/0104503 A1 * 8/2002 Nagai et al. .............. 123/188.1
2002/0129783 A1 * 9/2002 Lawrence ............... 123/195 C
2003/0219545 A1 * 11/2003 Herber ....................... 427/446
2004/0006860 A1 * 1/2004 Haytayan .................. 29/525.01
2004/0244181 A1 * 12/2004 Nakamura et al. ............ 29/563
2005/0039321 A1 * 2/2005 Stave et al. .................... 29/563
2005/0241129 A1 * 11/2005 Naumann et al. ........... 29/33 P
2005/0278930 A1 * 12/2005 Szuba et al. ................... 29/464

FOREIGN PATENT DOCUMENTS

KR    1019950008056 B1    7/1995
KR    1020040000984 A    1/2004

* cited by examiner

*Primary Examiner*—Dana Ross
(74) *Attorney, Agent, or Firm*—Peter F. Corless; Edwards Angell Palmer & Dodge LLP

(57) ABSTRACT

An apparatus for closing fluid passages of engines is disclosed. Preferred apparatus of the invention are able to automatically recognize inlets of several fluid passages, which exist in each engine at different positions depending on the engine model, and rapidly and precisely perform operation of closing the inlets at the recognized positions using a caulking device and a robot, thus enhancing manufacturing productivity of the engine.

16 Claims, 4 Drawing Sheets

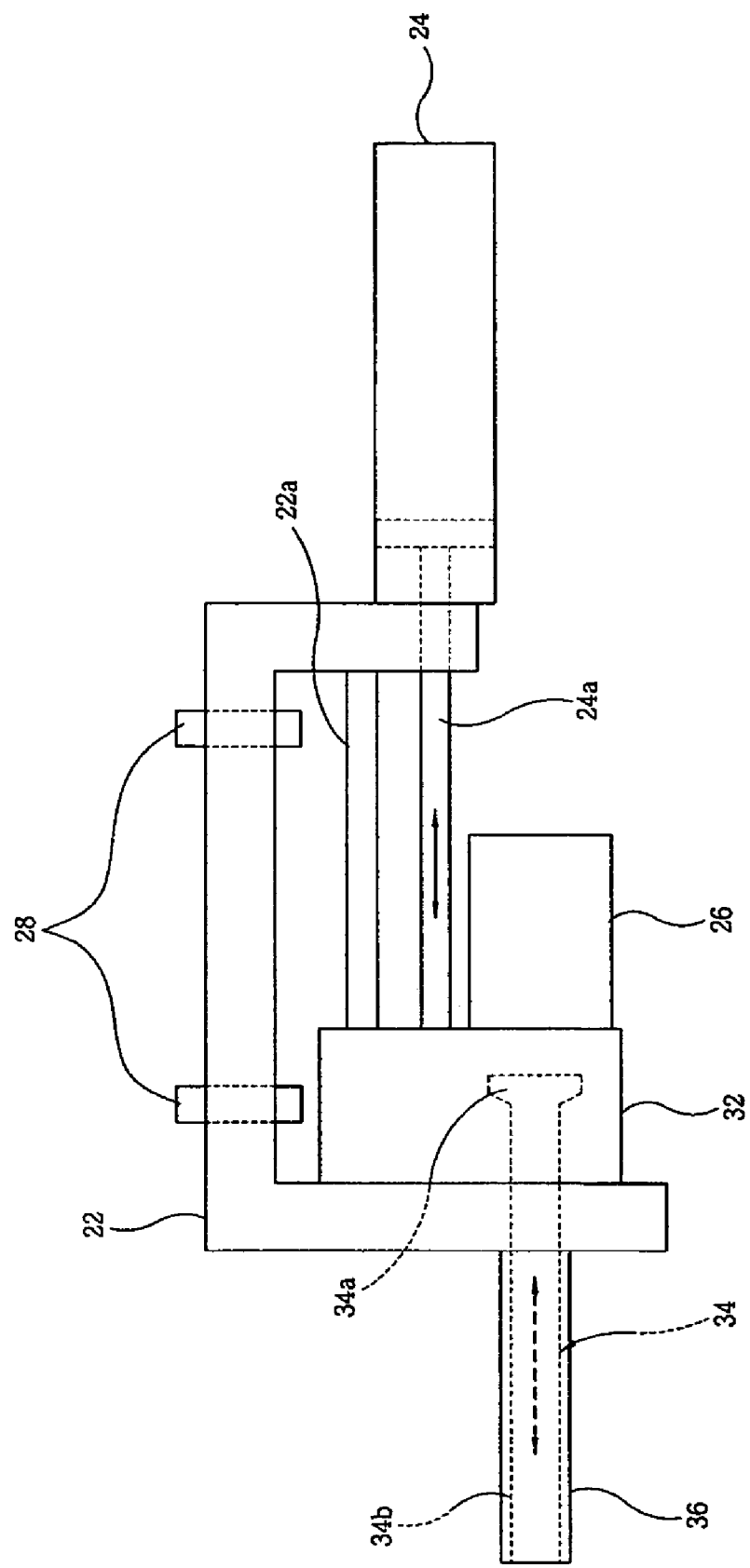

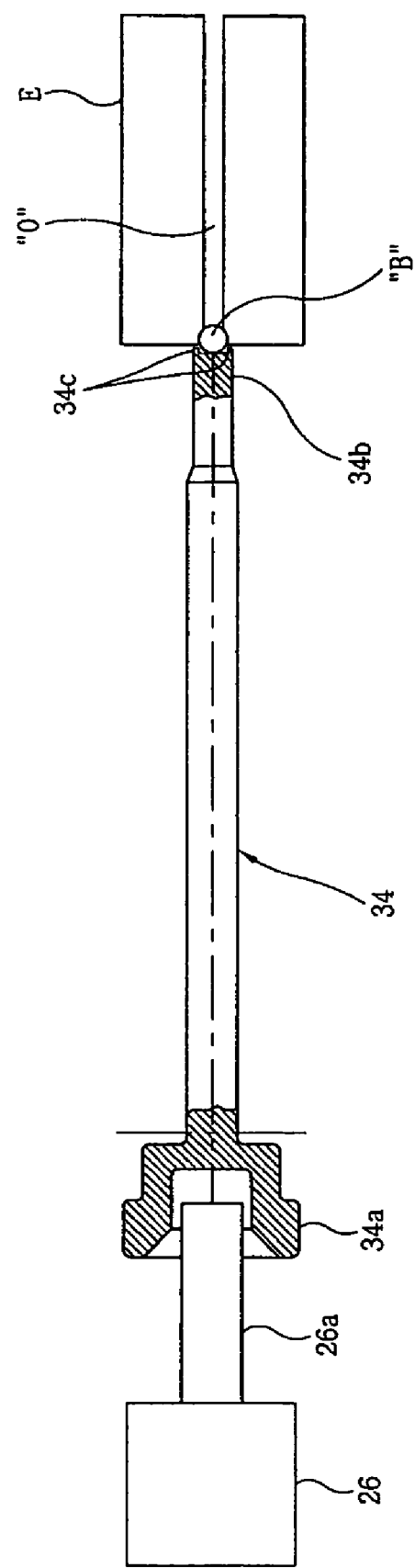

APPARATUS FOR CLOSING FLUID PASSAGES OF ENGINES

CROSS-REFERENCE TO RELATED APPLICATIONS

The present application is based on, and claims priority from, Korean Application Serial Number 10-2005-0104264, filed on Nov. 2, 2005, the disclosure of which is hereby incorporated by reference herein in its entirety.

FIELD OF THE INVENTION

The present invention relates to apparatuses for closing fluid passages of engines and, more particularly, to an apparatus for more efficiently closing inlets of fluid passages formed in a cylinder block and a cylinder head of an engine.

BACKGROUND OF THE INVENTION

Generally, fluid passages, through which fluid passes for lubrication or cooling, or to operate a variable valve timing device, are formed in the cylinder block and the cylinder head of an engine. Most fluid passages having the above-mentioned functions are formed through a separate drilling process after the cylinder block and the cylinder head have been made through casting.

Therefore, to ensure watertightness of the fluid passages formed in the cylinder block and the cylinder head through the drilling process, a passage closing operation must be performed after the drilling process. The closing operation is implemented by press-fitting a closing member, such as a tapered plug or a steel ball, into the inlet of each of the fluid passages formed in the cylinder block and the cylinder head.

The operation of closing the inlet of the fluid passage through the press-fitting process must be implemented several times even in one cylinder block or cylinder head. Thus, in consideration of productivity, an automated rather than manual process is preferred. In particular, an automatic press-fitting apparatus using a robot can be preferred.

An automatic press-fitting apparatus can be required to accommodate to a flexible manufacturing system (FMS) which is in use and in which a variety of vehicle models is manufactured in a single assembly line.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

In one aspect, an apparatus is provided which is able to automatically recognize inlets of several fluid passages, which exist in each engine at different positions depending on the engine model, and rapidly and precisely perform an operation of closing the inlets of the fluid passages at the recognized positions using a caulking device and a robot, thus markedly enhancing manufacturing productivity of the engine.

In a preferred aspect, an apparatus for closing one or more engine fluid passages is provided, which suitably comprises (i) a conveyor unit to transport one or more engines to a location at which a closing operation is performed; (ii) an engine identifying unit to recognize the engine being transported by the conveyor unit; (iii) a robot unit to manipulate the transported engine; and (iv) a device to close an inlet of a fluid passage of the transported engine. Preferably, the apparatus may further comprise a location setting unit to support the engine, suitably placed on the conveyor unit, at the location at which the closing operation is performed. The apparatus may function to close a variety of fluid passages of a manipulated engine, including one or more fluid passages in a cylinder block and/or cylinder head of a vehicle engine.

In a particularly preferred aspect, an apparatus for closing one or more fluid passages of an engine includes a conveyor unit that carries various models of engines, which are target objects, to a location at which a closing operation is performed. An engine model identifying unit recognizes and identifies a model of engine carried by the conveyor unit. A location setting unit holds and supports the engine, placed on the conveyor unit, at the location at which the closing operation is performed. A robot unit moves an arm thereof to a position at which the closing operation is performed and which is preset depending on the engine model identified by the engine model identifying unit. A caulking device is preferably mounted to the arm of the robot unit to press-fit a closing member into an inlet of the fluid passage at the preset position at which the closing operation is performed. The caulking device preferably includes a housing which is mounted to the arm of the robot unit, a closing operation unit which is mounted to the housing to perform the operation of closing the inlet of the fluid passage of the engine, an actuating force feed unit which feeds actuating force to the closing operation unit, and a position detecting unit which is mounted to the housing to detect a position of the closing operation unit. A control unit suitably moves the arm of the robot unit to the inlet of the fluid passage of the engine and controls the caulking device such that the operation of closing the inlet of the fluid passage of the engine is performed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like. The apparatus of the invention will be useful with a wide variety of vehicle engines and is particularly preferred for use with motor vehicle engines.

Other aspects of the invention are discussed below.

BRIEF DESCRIPTION OF THE DRAWINGS

For a better understanding of the nature and objects of the present invention, reference should be made to the following detailed description with the accompanying drawings, in which:

FIG. 3 is a schematic view showing the construction of the caulking device of FIG. 2; and FIG. 4 is a view showing a process of press-fitting a closing member into a fluid passage of an engine using the caulking device of FIG. 3.

DETAILED DESCRIPTION OF THE INVENTION

As discussed above, an apparatus for closing one or more engine fluid passages is provided, which suitably comprises (i) a conveyor unit to transport one or more engines to a location at which a closing operation is performed; (ii) an engine identifying unit to recognize the engine being transported by the conveyor unit; (iii) a robot unit to manipulate the transported engine; and (iv) a device to close an inlet of a fluid passage of the transported engine. Preferably, the apparatus may further comprise a location setting unit to support the engine, suitably placed on the conveyor unit, at the location at which the closing operation is performed. The apparatus may function to close a variety of fluid passages of a manipulated engine, including one or more fluid passages in a cylinder block and/or cylinder head of a vehicle engine. Preferred devices to close the one or more fluid passages include a caulking device. Preferably, such a caulking device is associated with the robot unit.

A preferred embodiment of the present invention is now described in detail with reference to the attached drawings.

An apparatus for closing fluid passages of engines according to the preferred embodiment of the present invention can be applied to a flexible manufacturing system (FMS) in which various engine models are manufactured together in a single manufacturing line.

Figure 1:
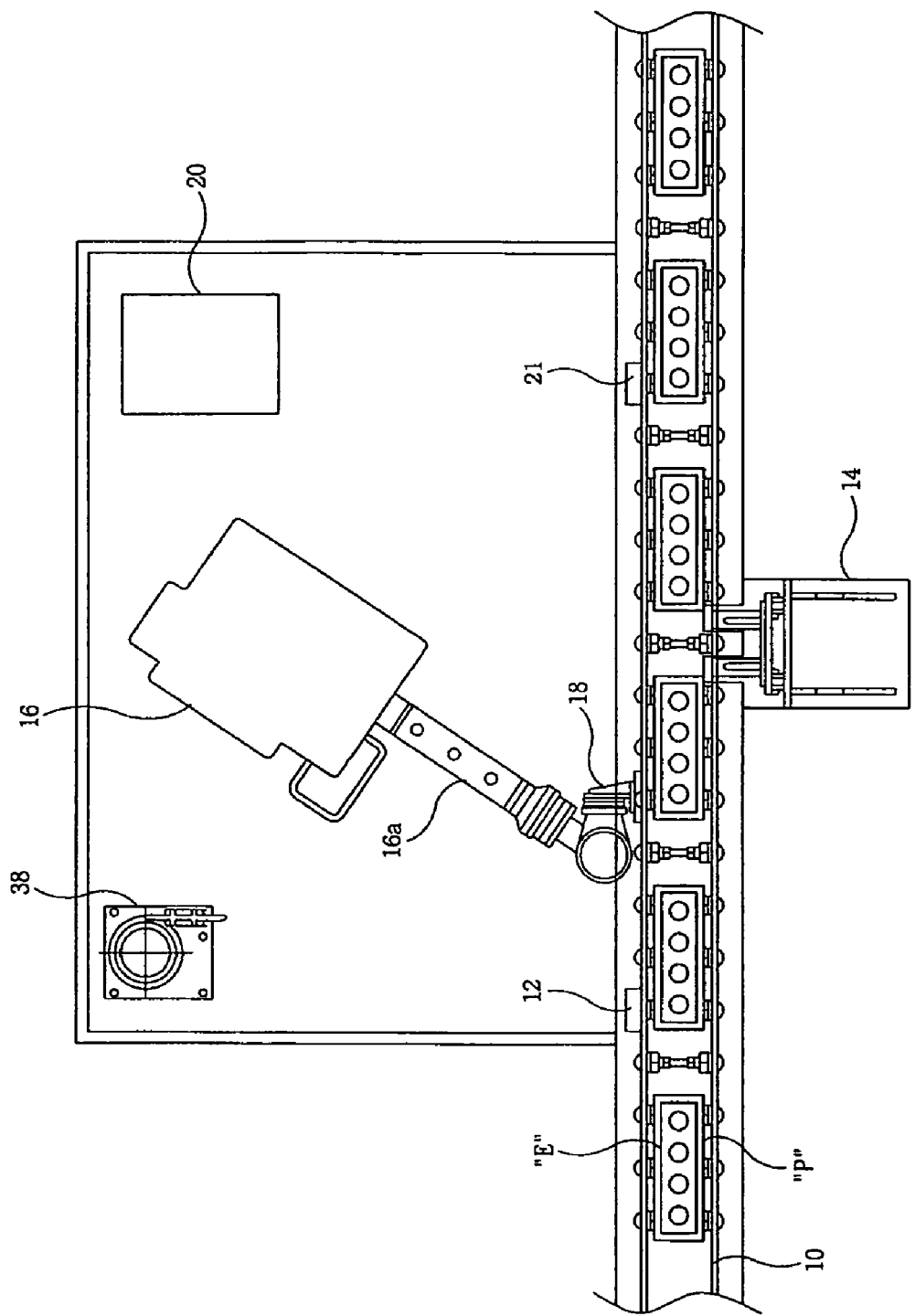
FIG. 1 is a view showing the construction of an apparatus for closing fluid passages of engines, according to a preferred embodiment of the present invention.

In detail, as shown in FIG. 1, the fluid passage closing apparatus of the present invention includes a conveyor unit 10 which carries various models of engines E, which are target objects and are placed on pallets P, to a location at which a closing operation is performed. The fluid passage closing apparatus preferably further includes an engine model identifying unit 12 which recognizes and identifies the model of each individual engine E, carried by the conveyor unit 10, and a location setting unit 14 which serves as a holding jig to hold the engine E, carried by the conveyor unit 10, at the location at which the closing operation is performed. The fluid passage closing apparatus further includes a robot unit 16 which suitably moves an arm 16a to an inlet of a fluid passage O (shown in FIG. 4) of the engine E, that is, a preset position at which the closing operation is performed, depending on the engine model identified by the engine model identifying unit 12. The fluid passage closing apparatus preferably further includes a caulking device 18 which is mounted to the arm 16a of the robot unit 16 and press-fits a closing member into the inlet of the fluid passage O at the preset position at which the closing operation is performed. The fluid passage closing apparatus may further include a control unit 20 which moves the arm 16a of the robot unit 16 to the inlet of the fluid passage O of the engine E and controls the operation of the caulking device 18 such that the operation of closing the inlet of the fluid passage O of the engine E is performed.

An error detection and recording unit 21 is preferably additionally provided, so that, after each closing operation of the caulking device 18 has been completed, the error detection and recording unit 21 tests the related portion and records the result.

Figure 2:
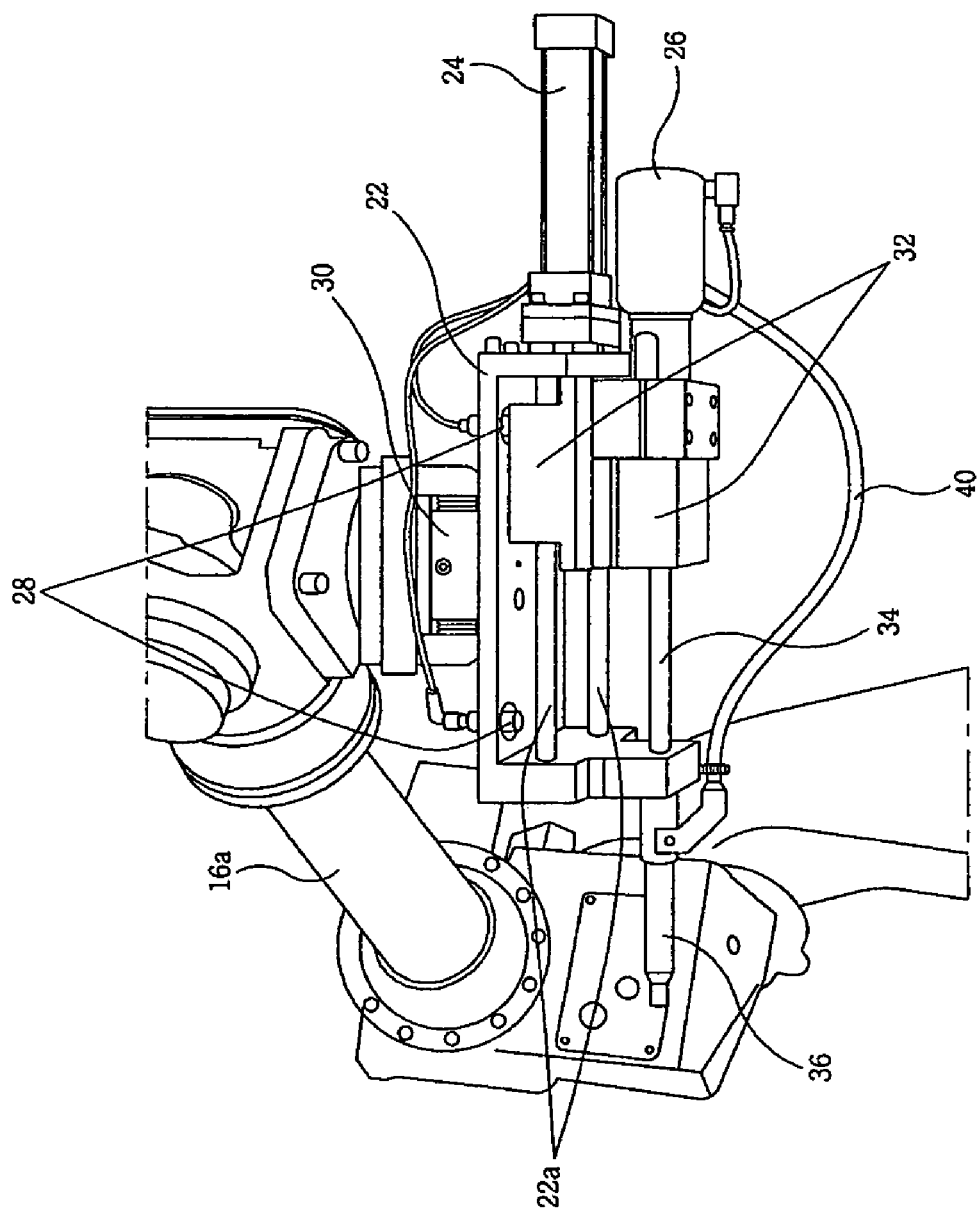
FIG. 2 is a view showing the construction of a caulking device of the fluid passage closing apparatus of FIG. 1.

As shown in FIGS. 2 and 3, the caulking device 18 includes a housing 22 which is mounted to the arm 16a of the robot unit 16, a closing operation unit which is mounted to the housing 22 and performs the closing operation of the inlet of the fluid passage O of the engine E, an actuating force feed unit which feeds actuating force to the closing operation unit, and a position detecting unit which is mounted to the housing 22 and detects the position of the closing operation unit.

The closing operation unit preferably includes a movable unit which is movably mounted to the housing 22, a striking unit which is mounted to the movable unit and press-fits a closing member into the inlet of the fluid passage O, and a closing member feed unit which consecutively feeds closing members to the striking unit.

The actuating force feed unit may include a first actuator 24 which is mounted to the housing 22 to provide actuating force for the movable unit, and a second actuator 26 which is mounted to the movable unit to provide actuating force for the striking unit.

The position detecting unit includes a position sensor 28 which is mounted to the housing 22 to detect the position of the movable unit.

The housing 22 is preferably removably mounted to the arm 16a of the robot unit 16 through an impact absorption damper 30. The impact absorption damper 30 serves to interrupt vibrations transmitted from the arm 16a during the operation of the caulking device 18, thus helping perform the closing operation of the desired portion precisely.

Furthermore, a guide bar 22a is preferably provided in the housing 22 to guide movement of the movable unit. The movable unit preferably comprises a movable body 32 which is movably fitted over the guide bar 22a provided in the housing 22.

Therefore, the movable body 32 is moved along the guide bar 22a by the operation of the first actuator 24, so that the position thereof in the housing 22 is variably adjusted. For this, a rod 24a of the first actuator 24 is coupled to the movable body 32 after passing through a sidewall of the housing 22.

The position sensor 28 detects the position of the movable body 32. Here, when the movable body 32 is at a position at which the movable body 32 is maximally advanced by the first actuator 24, the caulking device 18 enters a pre-operation state a (the state of FIG. 3). When the movable body 32 is at a retracted position, the caulking device 18 enters a closing operation preparation state (the state of FIG. 2).

As shown in FIG. 4, the striking unit includes a pressure receiving part 34a which is mounted to the movable body 32 and receives repetitive striking forces from an actuating member 26a of the second actuator 26, and a caulking rod 34 which integrally extends from the pressure receiving part 34a. The caulking rod 34 suitably has, on a free end thereof, a pressure applying part 34b which presses a closing member into the inlet of the fluid passage O of the engine E such that the closing member is fitted into the inlet. A caulking rim 34c is integrally provided around the distal end of the pressure applying part 34b. The caulking rim 34c, which is suitably provided on the pressure applying part 34b of the caulking rod 34, forcibly deforms a peripheral portion of the inlet of the fluid passage O of the engine E during the closing process, thus preventing the closing member, press-fitted into the fluid passage O, from being undesirably removed from the fluid passage O.

The caulking rod 34 is suitably movably inserted into a hollow bar 36 fastened to the housing 22. The hollow bar 36 can serve to guide the caulking rod 34 when press-fitting the closing member into the inlet of the fluid passage O of the engine E, thus making it possible to press-fit the closing member into the inlet of the fluid passage O of the engine more easily.

The closing member feed unit preferably includes a force-feed unit 38 which stores therein a plurality of closing members and force-feeds each closing member, and a feed hose 40 which communicates the hollow bar 36 with the force-feed unit 38 and feeds each closing member from the force-feed unit 38 to the hollow bar 36.

The first actuator 24 comprises a pneumatic cylinder which moves the movable body 32 with respect to the housing 22. The second actuator 26 includes a striking hammer which repeatedly applies striking force to the caulking rod 34.

Each closing member comprises a spherical steel ball B which has a diameter larger than the inner diameter of the fluid passage O of the engine E. As a consequence, the steel ball B can be press-fitted into the fluid passage O, having the smaller diameter, by the pressing force of the caulking rod 34.

A preferred operation of the apparatus for closing fluid passages of engines E according to the present invention will be described herein below.

While an engine E is carried by the conveyor unit 10 at a location at which a closing process is performed, the engine model identifying unit 12 identifies the model of the engine E and sends information about this to the control unit 20. At this time, the location setting unit 14 holds and supports the engine E which has reached the location at which the closing process is performed.

Thereafter, the control unit 20 adjusts the position of the arm 16a of the robot unit 16 such that the caulking operation of the caulking device 18 is performed at a desired position of the engine E which is preset depending on the engine model. Simultaneously, the control unit 20 operates the caulking device 18 such that a steel ball B, which is a closing member, is press-fitted into an inlet of a fluid passage O of the engine.

To treat subsequent engines E in the same manner as the above-mentioned process, the force-feed unit 38 consecutively feeds steel balls B into the hollow bar 36 of the caulking device 18 through the feed hose 40 under the control of the control unit 20.

Meanwhile, the process of press-fitting the steel ball B using the caulking device 18 is as follows.

In the closing operation preparation state in which the movable body 32 is retracted in the housing 22, as shown in FIG. 2, a steel ball B, having been fed into the hollow bar 36, is fed to a desired position. The first actuator 24 thereafter advances the movable body 32 to the pre-operation state, as shown in FIG. 3.

Subsequently, consecutive striking forces are applied to the pressure receiving part 34a of the caulking rod 34 by the operation of the second actuator 26. Then, the pressure applying part 34b of the caulking rod 34 press-fits the steel ball B into the inlet of the fluid passage O of the engine E. At this time, the caulking rim 34b provided on the pressure applying part 34b deforms the peripheral portion of the inlet of the fluid passage O such that the steel ball B press-fitted into the inlet of the fluid passage O is prevented from being removed.

In the above-mentioned process, because the position sensor 28 detects the position of the movable body 32 and determines whether the movable body 32 in the housing is in the closing operation preparation state or in the pre-operation state, the control unit 20 can easily control the operation of the first and second actuators 24 and 26.

As is apparent from the foregoing, the present invention provides an apparatus for closing fluid passages of engines which can automatically perform an operation of closing inlets of one or more fluid passages, which exist in each engine at different positions depending on the engine model, preferably using a robot and a caulking device in a flexible manufacturing system in which various engine models are manufactured together in a single manufacturing line. As a result, the operation of closing the fluid passages formed in the engine can be rapidly and precisely performed, thus markedly enhancing productivity when manufacturing the engines.

Although preferred embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for closing one or more fluid passages of one or more engines, comprising:

a conveyor unit to carry various models of engines, which are target objects, to a location at which a closing operation is performed;

an engine model identifying unit to recognize and identify a model of engine carried by the conveyor unit;

a location setting unit to hold and support said engine, placed on the conveyor unit, at the location at which the closing operation is performed;

a robot unit to move an arm thereof to a position at which the closing operation is performed and which is preset depending on the engine model identified by the engine model identifying unit;

a caulking device mounted to said arm of said robot unit to press-fit a closing member into an inlet of the fluid passage at the preset position at which the closing operation is performed, the caulking device comprising:

a housing mounted to the arm of the robot unit;

a closing operation unit mounted to the housing to perform the operation of closing the inlet of the fluid passage of the engine;

an actuating force feed unit to feed actuating force to the closing operation unit; and a position detecting unit mounted to said housing to detect a position of the closing operation unit; and a control unit to move the arm of the robot unit to the inlet of the fluid passage of the engine and control the caulking device such that the operation of closing the inlet of the fluid passage of said engine is performed.

2. The apparatus as defined in claim 1, wherein the closing operation unit comprises:

a movable unit movably mounted to the housing;

a striking unit mounted to said movable unit to press-fit the closing member into the inlet of the fluid passage of the engine; and a closing member feed unit to feed the closing member to the striking unit.

3. The apparatus as defined in claim 2, wherein the actuating force feed unit comprises:

a first actuator mounted to the housing to provide actuating force for the movable unit; and a second actuator mounted to the movable unit to provide actuating force for the striking unit.

4. The apparatus as defined in claim 2, wherein the position detecting unit comprises a position sensor mounted to the housing to detect a position of the movable unit.

5. The apparatus as defined in claim 1, wherein the housing is removably mounted to the arm of said robot unit through an impact absorption damper.

6. The apparatus as defined in claim 3, further comprising:

a guide bar provided in the housing to guide movement of the movable unit.

7. The apparatus as defined in claim 6, wherein the movable unit comprises a movable body movably fitted over the guide bar.

8. The apparatus as defined in claim 7, wherein the striking unit comprises:

a pressure receiving part mounted to the movable body to receive a striking force from said second actuator; and a caulking rod extending from the pressure receiving part and having a pressure applying part provided on an end of the caulking rod to press the closing member into the inlet of the fluid passage of the engine such that the closing member is fitted into the inlet, with a caulking rim provided around a distal end of the pressure applying part.

9. The apparatus as defined in claim 8, wherein the caulking rod is movably inserted into a hollow bar fastened to the housing.

10. The apparatus as defined in claim 9, wherein the closing member feed unit comprises:

a force-feed unit to store therein a plurality of closing members and force-feed each closing member; and a feed hose communicating said hollow bar with the force-feed unit so that the closing member is fed through the feed hose.

11. The apparatus as defined in claim 1, wherein the closing member is a spherical steel ball having a diameter larger than an inner diameter of the fluid passage of the engine.

12. An apparatus for closing one or more engine fluid passages, comprising:

a conveyor unit to transport one or more engines to a location at which a closing operation is performed;

an engine identifying unit to recognize the engine being transported by the conveyor unit;

a robot unit to manipulate the transported engine;

a device to close an inlet of a fluid passage of the transported engine.

13. The apparatus of claim 12 further comprising a location setting unit to support the engine, placed on the conveyor unit, at the location at which the closing operation is performed.

14. The apparatus of claim 12 wherein one or more fluid passages in a cylinder block and/or cylinder bead of a vehicle engine are closed by the device.

15. The apparatus of claim 12 wherein the device to close the one or more fluid passages is a caulking device.

16. The apparatus of claim 12 wherein the caulking device is associated with the robot unit.

* * * * *